United States Patent [19]

Siegfried, II

[11] 4,419,748
[45] Dec. 6, 1983

[54] CONTINUOUS WAVE SONIC LOGGING

[75] Inventor: Robert W. Siegfried, II, Plano, Tex.

[73] Assignee: Atlantic Richfield Company, Los Angeles, Calif.

[21] Appl. No.: 490,208

[22] Filed: May 5, 1983

Related U.S. Application Data

[63] Continuation of Ser. No. 222,433, Jan. 5, 1981, abandoned.

[51] Int. Cl.³ .............................. G01V 1/40; G01V 1/28
[52] U.S. Cl. ........................................ 367/31; 367/28; 367/32; 367/912; 181/102
[58] Field of Search ...................... 367/28, 29, 31, 32, 367/35, 47, 912; 181/102, 107

[56] References Cited

U.S. PATENT DOCUMENTS

| | | | |
|---|---|---|---|
| 2,868,311 | 1/1959 | Tullos | 367/912 |
| 2,878,886 | 3/1959 | Overton | 367/912 |
| 3,073,406 | 1/1963 | Westphal | 367/32 |
| 3,330,375 | 7/1967 | White | 367/29 |
| 3,719,924 | 3/1973 | Muir et al. | 367/63 |
| 4,184,562 | 1/1980 | Bakamjian | 367/86 |
| 4,319,345 | 3/1982 | Dennis | 367/912 |
| 4,328,567 | 5/1982 | Dodge | 367/32 |
| 4,339,810 | 7/1982 | Nichols et al. | 367/47 |

OTHER PUBLICATIONS

Pickett, "Acoustic Character Logs . . . Evaluation", 6/63, pp. 659-667, Journ. Petr. Tech.
Aron et al., "Formation Compressional . . . Techniques", 10/78, pp. 1-11, 53rd SPE of AIME.

Primary Examiner—Nelson Moskowitz
Attorney, Agent, or Firm—Albert C. Metrailer

[57] ABSTRACT

Apparatus and method for sonic borehole logging using a continuous wave transmitted signal. The transmitted signal is received at a plurality of points distributed along the borehole axis and sampled synchronously with the transmitted signal. The resulting sampled signal is analyzed, for example, by Fourier analysis, to identify each spatial frequency component. Each frequency component identified indicates the velocity of a particular acoustic wave path from the transmitter to the receiver.

5 Claims, 3 Drawing Figures

U.S. Patent    Dec. 6, 1983    4,419,748
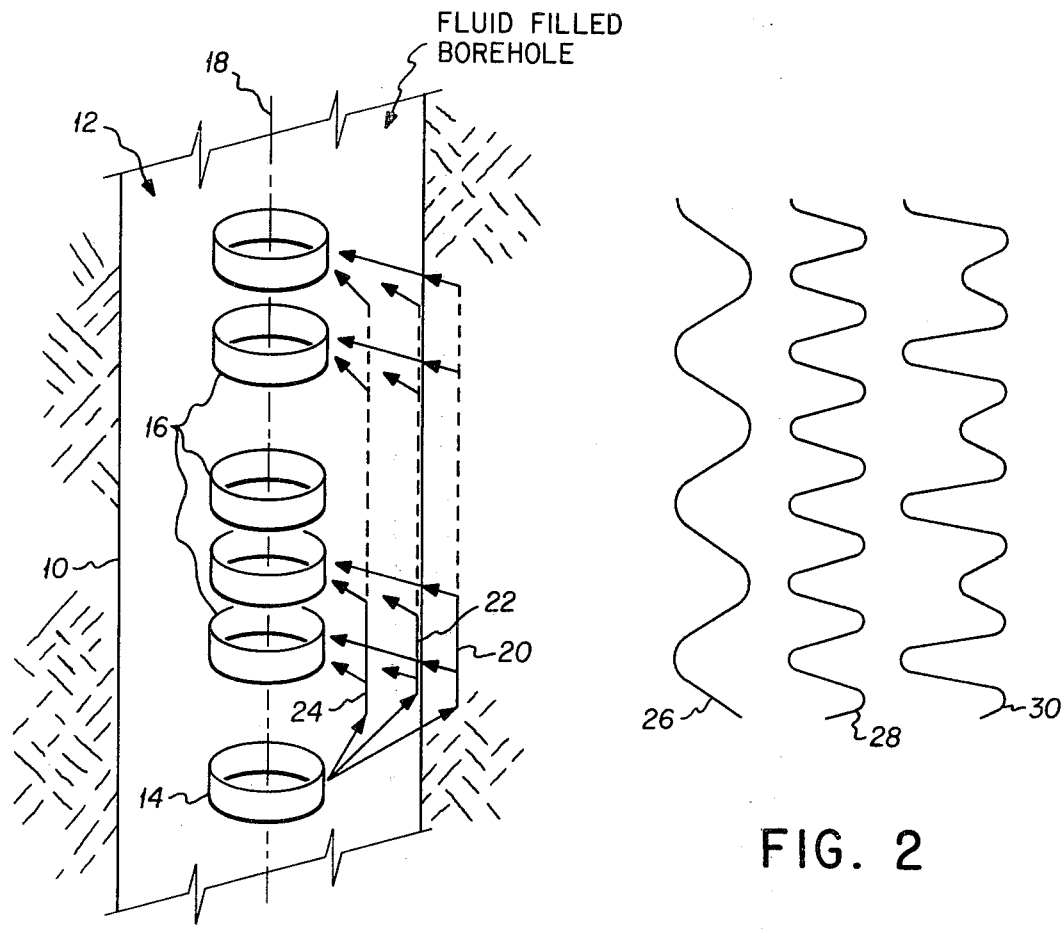
FIG. 1
FIG. 2
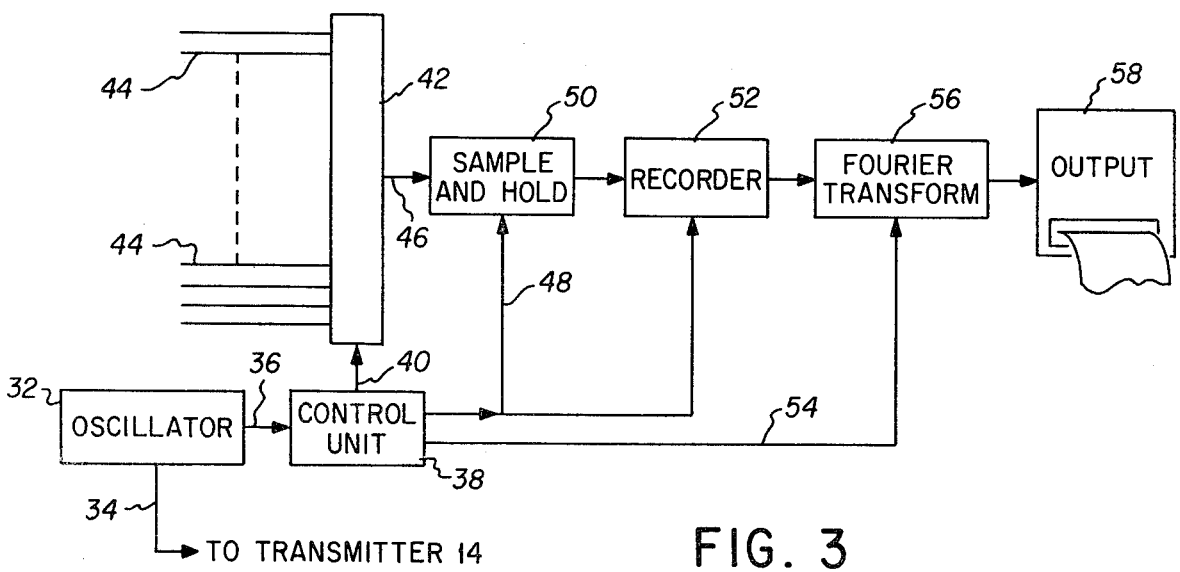
FIG. 3

CONTINUOUS WAVE SONIC LOGGING

This application is a continuation of application Ser. No. 222,433, filed Jan. 5, 1981, now abandoned.

BACKGROUND OF THE INVENTION

This invention relates to sonic borehole logging tools and methods and more particularly, to sonic borehole logging using a continuous wave input signal.

Sonic borehole logging is an accepted method of measuring the mechanical properties of material around a borehole by measurement of velocities of various elastic waves which travel through the material and surface waves guided by the borehole material interface. Such logging basically involves the injection of acoustic energy into a borehole wall at one point and the reception of part of that energy which has been transmitted back into the borehole at another point. With a known distance between transmitter and receiver, the time lag between transmission and reception can be used to indicate acoustic energy velocity and other parameters. More accurate equipment has a single transmitting transducer and two receiving transducers with the time measurement being made between the reception of signals at the two receiving transducers which are spaced apart a known distance.

Most known borehole logging tools use an impulse-type transmitted signal which is detected as a series of wavelets at the receiving transducers. Such conventional pulsed techniques require subjective operator intervention in such matters as choosing correlation windows, thresholds, etc. and this prevents such techniques from being truly reliable automated velocity measurement methods, especially for waves other than the compressional first arrival. It would be desirable to have a logging device which can indicate such travel times reliably without subjective operator intervention.

SUMMARY OF THE INVENTION

Accordingly, an object of the present invention is to provide an improved borehole logging tool and method.

Another object of the present invention is to provide a sonic borehole logging device and method using a continuous wave transmitted signal.

A sonic borehole logging device according to the present invention includes a continuous wave sonic transmitter and receiving means for receiving the transmitted acoustic signals at a plurality of positions displaced along the axis of a borehole from the transmitter. Receiver sampling means are provided for recording the instantaneous values of received signal at times which are synchronized with a preselected point on each cycle of the transmitted continuous wave signal. A resulting recorded signal contains various spatial frequency components each corresponding to and indicating the velocity of a separate sonic path from the transmitter to the receivers. In a preferred form, a signal analyzer is included to separate the recorded signal into its various frequency components and thereby provide direct indications of velocities of the various sonic paths.

BRIEF DESCRIPTION OF THE DRAWINGS

The present invention may be better understood by reading the following detailed description of the preferred embodiments with reference to the accompanying drawings wherein:

FIG. 1 is a schematic illustration of a borehole logging tool according to the present invention positioned in a cross-sectioned borehole;

FIG. 2 is a plot of various waveforms occurring in the present invention; and

FIG. 3 is a block diagram of an electronic system for use with the borehole logging tool of the present invention.

DESCRIPTION OF THE PREFERRED EMBODIMENTS

With reference now to FIG. 1, one form of a sonic borehole logging device according to the present invention is illustrated. In FIG. 1, the device is illustrated in a cross-sectioned borehole 10 which would in practice be filled with fluid. The logging device is illustrated generally at 12 and includes a transmitting transducer 14 at its lower end and a large number of receiving transducers 16 at its upper end. Transducers 14 and 16 may be any of the conventional hollow cylindrical elements made of magnetostrictive or piezoelectric materials. The exact type of transducer is not believed to be critical to operation of the present invention. In this preferred embodiment, a total of fifty of the receiving transducers 16 are positioned at two centimeters spacings along the axis 18 of borehole 10.

The number and spacing of receiving transducers 16 is based on a nominal operating frequency of 20 kilohertz. At this operating frequency the wave path through the borehole fluid has a velocity of approximately 1.5 km per second and a wavelength of about 7.5 centimeters. The two centimeter spacing of receiving elements 16 provides more than sufficient sampling of this highest spatial frequency of interest. This receiver spacing also allows some increase in operating frequency or detection of somewhat higher spatial frequencies as desired. The approximately 100 centimeters of receiving length is believed to provide an adequate number of cycles of the lowest detected frequency for proper processing.

As is well known in the sonic borehole logging art, acoustic waves travel a number of different paths from the transmitter 14 to the receivers 16. The path which is usually of the most interest is indicated by the arrowed lines 20. This sonic path passes from the transmitter 14 into the material surrounding borehole 10, along a length of the borehole, back into the borehole fluid and finally to the receivers 16. This path 20 actually includes at least two distinct modes of propagation having different velocities, comprising compressional waves and shear waves. Another sonic energy path is the surface wave path indicated at 22 which follows the surface of borehole 10. The velocities of surface waves 22 differ from both the compressional and shear waves which follow path 20. A direct fluid wave may follow the path 24 through the fluid-filling borehole 10. Thus, it is seen that there are a plurality of paths which acoustic waves follow from transmitter 14 to receivers 16 and within these paths there are a number of propagation modes with each mode and each path having different propagation velocities. In the prior art devices and methods, the various paths are distinguished by the times of arrival of impulses at various receivers after a single impulse is transmitted. In the present invention, a continuous signal, such as a sine wave at 20 kilohertz, is transmitted by transmitting transducer 14. Other frequencies may be used but may require changes in the number and spacing of receiving transducers 16.

FIG. 2 provides a simplified example of wave forms which may occur in practice of the present invention. These wave forms each represent an instantaneous "snapshot" type view of signal amplitude along the length of borehole 10. A wave 26 may, for example, represent a pressure wave following path 20 while waveform 28 represents a shear wave following a similar path. In this example, the shear wave 28 travels at half the velocity and, therefore, has twice the spatial frequency of pressure wave 26. Neither of the waveforms 26 and 28 exist independently of the other but actually form a composite wave such as waveform 30. For purposes of this example, the other waves such as borehole surface waves and tube waves following paths 22 and 24 have been ignored. It is apparent that knowledge of the spatial frequencies represented by waveforms 26 and 28 together with the known time frequency of the signal transmitted by transducer 14 is sufficient information to precisely determine the velocity of the particular acoustic transmission path and mode. Each of the various spatial frequency components 26 and 28 are contained within the composite waveform 30. Conventional Fourier analysis of waveform 30 may be used to identify the various waveforms such as 26 and 28.

FIG. 3 shows in block diagram form an electronics system suitable for operating the logging device 12 of FIG. 1. This system includes a fixed frequency oscillator 32 having a first output 34 coupled to the transmitting transducer 14. In addition, oscillator 32 provides an output 36 to a control unit 38. Control unit 38 has a first output 40 connected to an input of a multiplexer 42. Multiplexer 42 has a plurality of inputs 44 each electrically connected to one of the receiving transducers 16. Multiplexer 42 has a single output 46 to which each of the inputs 44 is sequentially connected in response to pulses received on input 40. Control unit 38 also provides signals on an output 48 to a sample and hold unit 50 and a recorder 52. Control unit 38 finally provides an output on a line 54 to a Fourier transform unit 56 which has an output coupled to an output device 58 such as a strip-chart recorder.

The logging device illustrated in FIG. 1 and in FIG. 3 operates as follows. After a sonde containing the elements 12 is properly positioned in a fluid-filled borehole, the transmitter 32 is activiated to cause transmitting device 14 to transmit a continuous sine wave signal into borehole 10 and thereby through the surrounding rock. Portions of the transmitted signal travel the various paths 20, 22 and 24 and are received by receiving transducers 16. The outputs of transducers 16 are continuously fed to the input lines 44 of multiplexer 42. One of the inputs 44 is coupled to output 46 by multiplexer 42. Control unit 38 detects a preselected point on each cycle of the transmitted wave for synchronizing the sampling of the outputs of receivers 16. This preselected point may be, for example, the positive going zero crossing of each cycle. Upon occurrence of this synchronizing point during each cycle, a pulse is provided on output 48 which causes sample and hold unit 50 to sample the signal it receives on line 46. The same pulse 48 is fed to recorder 52 which preferably permanently records the sample value provided by sample and hold unit 50. Sometime before the next synchronizing point is detected, control unit 38 provides a pulse in output 40 causing multiplexer 42 to sequence to the next state in which the next input 44 is coupled to the output 46. If desired, this sequence in the multiplexer 42 could occur on the negative going zero-crossing of the oscillator 32 signal to allow multiplexer 42 to settle before sample and hold unit 50 is activated. Such timing techniques to allow for proper settling of sampled signals are known to those skilled in the art and do not form part of the present invention. In any case, after each of the inputs 44 has been sampled once, a complete record of synchronized samples is provided in recorder 52. The samples, therefore, represent a waveform such as wave 30 of FIG. 2 with each sample representing an amplitude and the space between samples corresponding to the physical distance between receivers 16.

For an essentially real time output, control unit 38 may provide a pulse on output 54 each time a complete set of samples has been recorded and thereby cause transform processer 56 to analyze the waveform recorded in recorder 52. The output of the processer 56 may be fed to an output device such as a strip-chart recorder which would provide a trace of amplitude versus spatial frequency. The peaks in such a trace identify the spatial frequencies of waveforms such as 26 and 28. Since the time frequency of oscillator 32 is known, output device 58 may be properly scaled so that its output trace may be read directly in terms of the velocity of each of the acoustic wave paths. Thus, for a known input frequency of 20 kilohertz, the velocity of each component may be determined by inverting the spatial frequency to obtain the spatial wavelength and then dividing by 0.05 millisecond.

While the FIG. 1 embodiment illustrates a plurality of receiving transducers 16, it will be appreciated that the appropriate signal samples may be detected in other ways. For example, a single transducer 16 may be employed if it is moved through each of the positions indicated in FIG. 1. As long as the precise physical location of the receiving transducer is known at the time each sample is taken, the appropriate waveform such as 30 in FIG. 2 will be properly recorded. If such an arrangement is used, the multiplexer 42 in FIG. 3 will, of course, not be needed but control unit 38 might be somewhat more complex. It may also be appropriate to employ the conical directional reflectors illustrated in U.S. Pat. No. 4,184,562 issued to Bakamjian on Jan. 22, 1980. The location of the conical reflector rather than the actual electroacoustic transducer determines the signal receiver point. As a result, the conical reflector could be oscillated along the axis 18 of the borehole while a transducer remains stationary at the upper end of logging device 12. This would avoid the need for moving electrical conductors which would otherwise be required if the transducer itself is oscillated.

While as described above, the apparatus of FIG. 3 can provide a frequency analysis each time a complete record has been stored in recorder 52, it is preferred that recorder 52 have sufficient capacity to permanently store all records for later processing. Thus, a simple frequency analysis device such a filter bank might be used as the Fourier transform device 56 in the field for verification purposes only. The complete record stored in recorder 52 could then be reprocessed in more precise analysis equipment at a later time to provide a more detailed sonic log output.

The above-described logging procedure employs only a single frequency. If it is desired to study dispersion characteristics, the signal frequency may be changed during the logging run or for a subsequent logging run. In a similar manner, it will be appreciated that the amplitude of waveform 30 in FIG. 2 should be somewhat lower at the upper end than at the lower end. By proper analysis, the attenuation of the waveform can be quantitatively determined to provide further information about the materials surrounding the borehole.

While the present invention has been illustrated and described with respect to particular apparatus and methods of use, it is apparent that various modifications to this apparatus and methods may be made within the scope of the present invention as defined by the appending claims.

What is claimed is:

1. A sonic borehole logging system comprising:
    a transmitting transducer for transmitting acoustic signals in a borehole,
    transmitter means coupled to said transmitting transducer for causing said transmitting transducer to transmit a continuous sine wave signal at a preselected frequency,
    a plurality of receiving transducers displaced linearly at a plurality of preselected distances from said transmitting transducer, and
    receiver sampling means coupled to said transmitter means and to said receiving transducers for recording only instantaneous samples of the amplitude of the acoustic signals received by said receiving transducers at times synchronized with a preselected point on each cycle of said continuous sine wave signal.

2. A sonic borehole logging system according to claim 1 further including:
    signal analysis means coupled to said receiver sampling means and having an output for providing indications of the spatial frequency components of a signal represented by the recorded samples of acoustic signals, each of said components representing a separate acoustic path or mode of propagation from said transmitting transducer to said receiving transducers.

3. A sonic borehole logging system according to claim 2 wherein:
    said plurality of receiving transducers are equally spaced, said spacing selected to be less than half of an expected maximum spatial frequency component of a signal represented by the recorded samples of acoustic signals.

4. A method of sonic borehole logging comprising:
    transmitting a continuous sine wave acoustic signal at a substantially fixed first point within a borehole,
    while transmitting said signal at said first point, detecting instantaneous values of acoustic signal amplitude at a plurality of points displaced along the axis of said borehole from said first point at times synchronized with a preselected point on each cycle of said transmitted signal, and
    recording only said instantaneous values as a function of displacement along said borehole axis, whereby said recorded signal contains spatial frequency components indicating the velocities of various acoustic paths from the point of transmission to the points of reception of the acoustic signal.

5. The method of sonic borehole logging of claim 4 further including:
    analyzing said recorded signal to identify each frequency component of said recorded signal, whereby an indication of the velocity of various acoustic paths from the point of transmission to the points of reception of the acoustic signal is obtained.

* * * * *